(12) United States Patent
Burke et al.

(10) Patent No.: US 9,136,045 B2
(45) Date of Patent: Sep. 15, 2015

(54) COMPOSITE COMMUNICATIONS CABLE

(71) Applicant: General Cable Technologies Corporation, Highland Heights, KY (US)

(72) Inventors: Michael J. Burke, Marshfield, MA (US); Michael R. Rainville, Bow, NH (US); Katie A. Greene, Cranston, RI (US); Brian P. Skocypec, North Attleboro, MA (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/067,366

(22) Filed: Oct. 30, 2013

(65) Prior Publication Data
US 2015/0117825 A1    Apr. 30, 2015

(51) Int. Cl.
*G02B 6/44*    (2006.01)
*H01B 11/22*    (2006.01)
*H01B 11/16*    (2006.01)

(52) U.S. Cl.
CPC .............. *H01B 11/22* (2013.01); *G02B 6/4416* (2013.01); *H01B 11/16* (2013.01)

(58) Field of Classification Search
CPC ........ H01B 11/22; H01B 11/16; H01B 11/02; G02B 6/4416; G02B 6/3817; G02B 6/4413
USPC .......................... 385/101, 110, 105; 174/70 R
See application file for complete search history.

(56) References Cited

U.S. PATENT DOCUMENTS

| | | | |
|---|---|---|---|
| 4,575,184 A | 3/1986 | Ueno et al. | |
| 4,755,629 A * | 7/1988 | Beggs et al. | ..................... 174/34 |
| 4,784,461 A * | 11/1988 | Abe et al. | ...................... 385/112 |
| 5,177,809 A * | 1/1993 | Zeidler | .......................... 385/105 |
| 6,239,379 B1 * | 5/2001 | Cotter et al. | .............. 174/110 R |
| 6,295,401 B1 | 9/2001 | Rutterman et al. | |
| 6,687,437 B1 | 2/2004 | Starnes et al. | |
| 6,973,243 B2 * | 12/2005 | Koyasu et al. | ................. 385/100 |
| 7,534,964 B2 * | 5/2009 | Clark et al. | ............... 174/113 R |
| 7,612,289 B2 | 11/2009 | Lique et al. | |
| 7,643,713 B2 | 1/2010 | Buthe et al. | |
| 7,834,271 B2 | 11/2010 | Gromko et al. | |

(Continued)

FOREIGN PATENT DOCUMENTS

| | | |
|---|---|---|
| GB | 2123164 | 1/1984 |
| JP | 2001-052539 | 2/2001 |
| JP | 2003-132746 | 5/2003 |

OTHER PUBLICATIONS

Copenheaver, Blaine R.; International Search Report and Written Opinion of the International Searching Authority, issued in International Application No. PCT/US2014/062181; dated as mailed on Feb. 9, 2015; 9 pages.

*Primary Examiner* — Ellen Kim
(74) *Attorney, Agent, or Firm* — Ulmer & Berne LLP

(57) ABSTRACT

A communications cable that has a core that includes a dielectric separator. The separator has a spline that extends longitudinally in the core, thereby dividing the core into at least two quadrants. The separator also has at least one compartment. At least one pair of twisted insulated conductors is received in at least one of the quadrants and at least one optical fiber is received in the compartment of the dielectric separator. An outer jacket substantially surrounds the core.

19 Claims, 2 Drawing Sheets

(56) References Cited

U.S. PATENT DOCUMENTS

| | | |
|---|---|---|
| 7,897,875 B2 | 3/2011 | Gareis |
| 7,954,518 B2 | 6/2011 | Torrance et al. |
| 8,204,348 B2 | 6/2012 | Keller et al. |
| 8,295,665 B2 | 10/2012 | Herbst |
| 8,319,104 B2 | 11/2012 | Camp, II et al. |
| 8,625,946 B2 * | 1/2014 | Kachmar ..................... 385/110 |
| 8,718,428 B2 * | 5/2014 | Hurley et al. .................. 385/112 |
| 2005/0029007 A1 * | 2/2005 | Nordin et al. ............. 174/113 R |
| 2006/0237221 A1 * | 10/2006 | Glew ............................ 174/146 |
| 2007/0193769 A1 * | 8/2007 | Clark et al. ............... 174/113 R |
| 2008/0264670 A1 * | 10/2008 | Glew ............................ 174/113 |
| 2009/0078439 A1 | 3/2009 | Wiekhorst |
| 2009/0126971 A1 * | 5/2009 | Fok ........................... 174/113 A |
| 2012/0222883 A1 | 9/2012 | Nordin et al. |
| 2013/0014972 A1 | 1/2013 | Wiebelhaus et al. |

* cited by examiner

COMPOSITE COMMUNICATIONS CABLE

FIELD OF THE INVENTION

The present invention relates to a composite cable for supporting both conductors and optical fiber.

BACKGROUND OF THE INVENTION

There is an increasing need for both wire conductors and optical fiber, particularly in building installations. Typically, multiple cables must be installed and connected to networks. The different cables increase installation and maintenance cost. That is particularly true when optical fiber is needed in an already installed copper infrastructure.

SUMMARY OF THE INVENTION

Accordingly, the present invention provides a communications cable that has a core that includes a dielectric separator. The separator has a spline that extends longitudinally in the core, thereby dividing the core into at least two quadrants. The separator also has at least one compartment. At least one pair of twisted insulated conductors is received in at least one of the quadrants and at least one optical fiber is received in the compartment of the dielectric separator. An outer jacket substantially surrounds the core.

The present invention may also provide a communications cable that has a core that includes a dielectric separator that divides the core into four quadrants configured to support a plurality of pairs of twisted insulated conductors. The dielectric separator has a spline that extends longitudinally in the core and has first and second compartments that extend along opposite sides of the spline, respectively. Each of the first and second compartments is an enclosed channel configured to receive an optical fiber. An outer jacket substantially surrounds the core.

The present invention may further provide a communications cable that has a core that includes a dielectric separator that divides the core into four quadrants. The dielectric separator has a spline that extends longitudinally in the core and has first and second compartments disposed on opposite sides of the spline, respectively. The core has a plurality of pairs of twisted insulated conductors. At least one of the plurality of pairs of twisted insulated conductors is received in each the quadrants of the dielectric separator. First and second optical fibers are received in the first and second compartments, respectively, of the dielectric separator. An outer jacket substantially surrounds the core.

With those and other objects, advantages, and features of the invention that may become hereinafter apparent, the nature of the invention may be more clearly understood by reference to the following detailed description of the invention, the appended claims, and the several drawings attached herein.

DETAILED DESCRIPTION OF THE PREFERRED EMBODIMENTS

Figure 1:
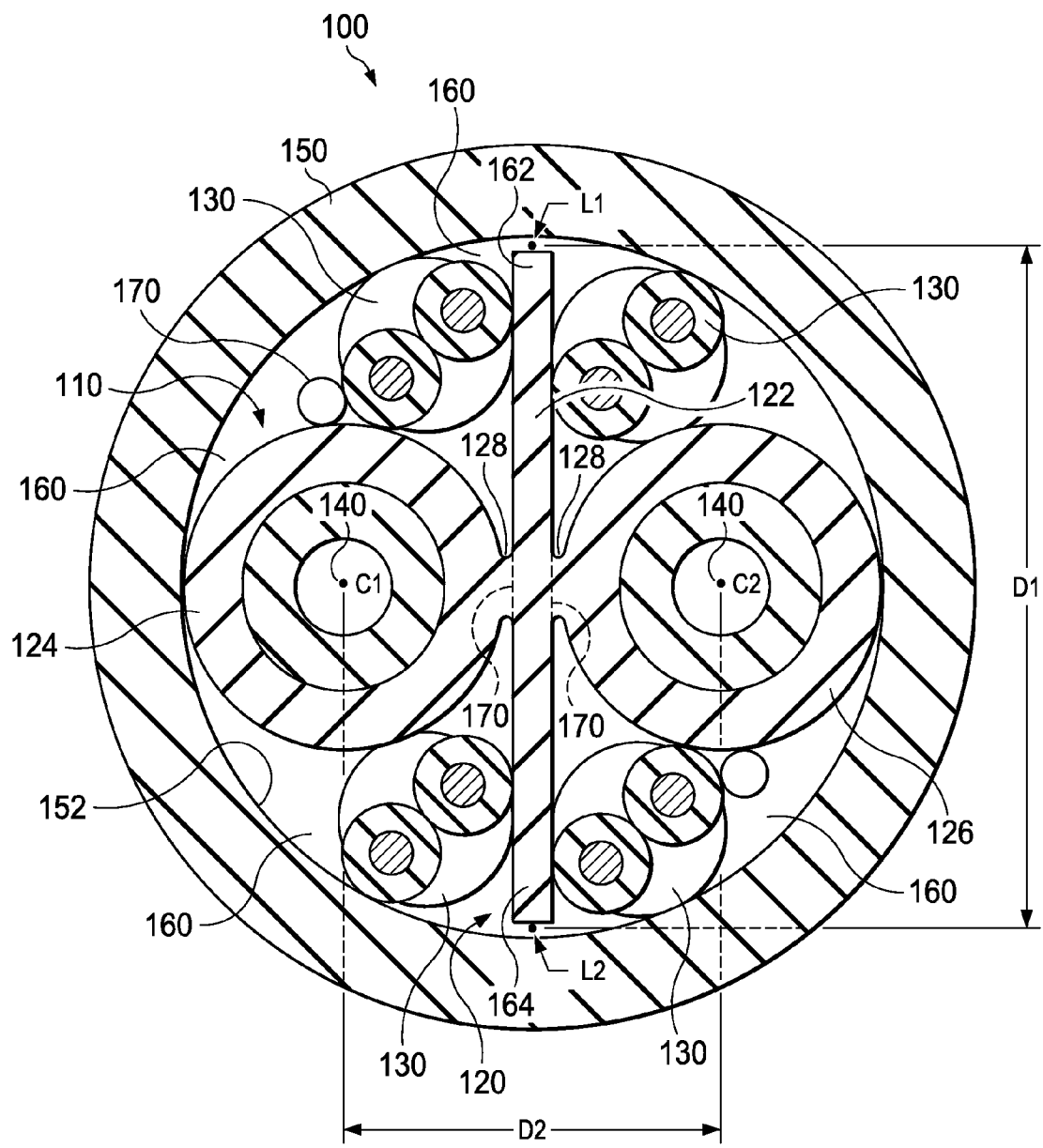
FIG. 1 is a cross-sectional view of a composite communications cable according to an exemplary embodiment of the present invention.
Figure 2:
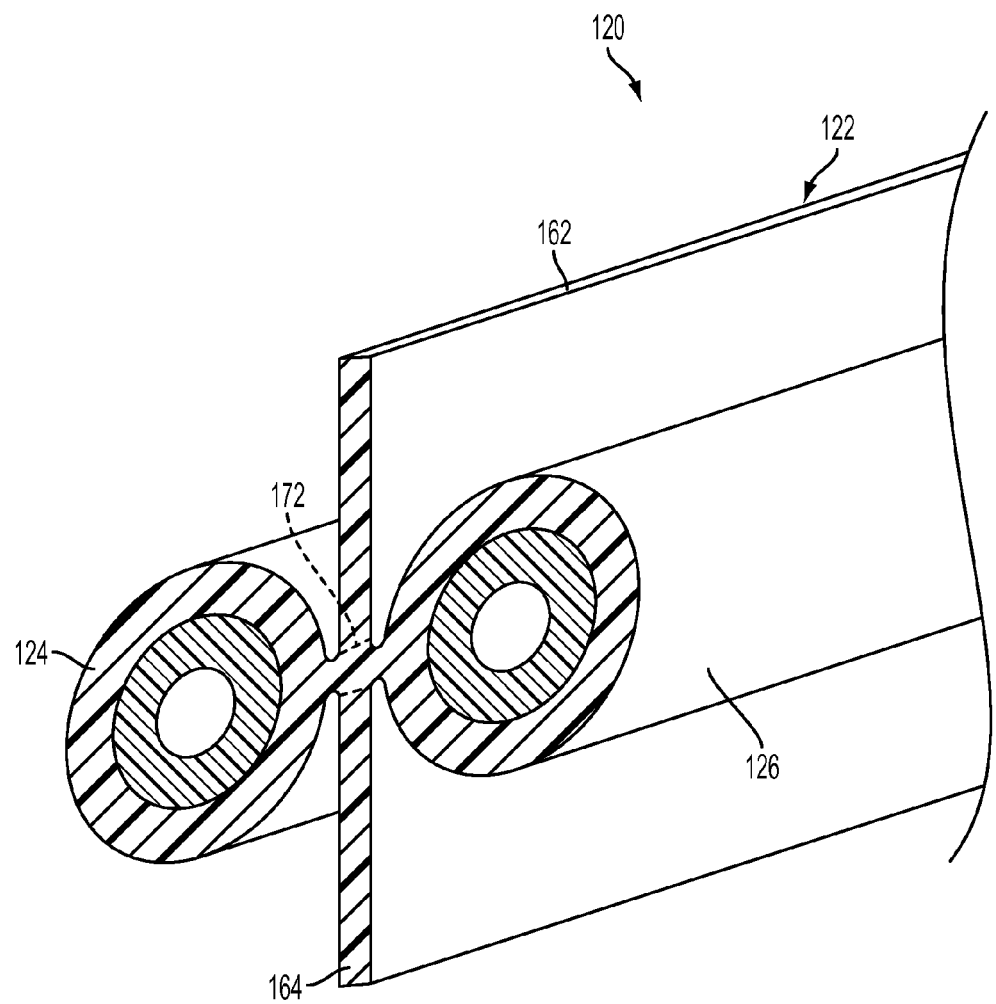
FIG. 2 is a perspective view of a separator of the composite communications cable illustrated in FIG. 1.

Referring to FIGS. 1 and 2, a composite communications cable 100 according to an exemplary embodiment of the present invention, is illustrated. The cable 100 is constructed to accommodate two different types of media for data transfer, such as wire conductors and optical fibers. The cable 100 reduces costs by providing a single cable that can accommodate both media types while also reducing interference. The cable 100 also simplifies installation by eliminating the need to pull two different cables and allowing the conductors and fibers to be installed at the same time or at different times.

Cable 100 generally includes a core 110 that has a separator 120 and both types of media, such as copper conductors, that may be insulated and twisted into pairs 130 as is well known in the art, and optical fibers 140. An outer jacket 150 preferably surrounds the core 110. The core 110 may be unshielded or shielded.

The separator 120 is preferably formed of a dielectric material, such as a thermoplastic polymer, namely Polyvinyl Chloride, Polyolefin, Fluoropolymer, Polyetherimide and the like. The separator 120 generally includes a spline 122 and first and second compartments 124 and 126 on either side of the spline 122 that are adapted to hold optical fiber 140. In a preferred embodiment, the spline 122 and the compartments 124 and 126 are integral, such that the separator 120 is a unitary one-piece member. Webs 128 may connect the compartments 124 and 126 to the spline 122. Alternatively, the compartments 124 and 126 can be formed separately from the spline 122 and attached thereto in any known manner, such as by adhesive.

The spline 122 and the first and second compartments 124 and 126 extend longitudinally within the cable core. The compartments 124 and 126 are generally centrally located on the spline 122 to form a crossweb shape, as seen in FIG. 1, thereby dividing the core 110 into a plurality of quadrants 160, preferably four quadrants, that are adapted to hold the conductor pairs 130. The spline 122 generally divides the core 110 in half such that its first and second ends 162 and 164 extend to the inner surface 152 of the outer jacket 150. The ends 162 and 164 of the spline 122 may touch the jacket's inner surface 152 at respective locations L1 and L2 (FIG. 1). The distance D1 between the locations L1 and L2 can define the length of the spline 122. Each of the first and second compartments 124 and 126 is an enclosed channel that may have a substantially circular cross-sectional shape, as seen in FIG. 1. At least one optical fiber 140 is received in the channel of the first and second compartments 124 and 126. The compartments 124 and 126 may be sized such that an outer diameter thereof touches or nearly touches the inner surface 152 of the outer jacket 150. In a preferred embodiment, at least one pair of conductors 130 is received in each of the quadrants 160 so that each pair of conductors 130 is generally sandwiched between one of the ends 160 and 162 of the spline 122 and one of the compartments 124 and 126, thereby isolating each conductor pair 130 to reduce interference. Although the separator 120 preferably includes first and second compartments 124 and 126, the separator 120 may include only one compartment or more than two compartments to hold optical fiber.

As illustrated in FIG. 1, the first and second compartments 124, 126 can be attached to the spline 122 such that the spline is between the first and second compartments 124, 126. The fist and second compartments 124, 126 can define respective centerlines C1, C2. The first and second compartments 124, 126 can be laterally spaced from the spline 122 such that the centerlines C1, C2 are spaced apart by a distance D2. The first and second compartments 124, 126 can be located adjacent to each other such that the distance D2 is less than the overall length of the spline 122 (e.g., the distance D1).

Weakened sections 170 may be provided in the webs 128 of the separator 120 that allow the compartments 124 and 126 to be torn from the spline 122, if for example, those compartments are not needed for the installation. A ripcord 172 (FIG. 2), may be provided near the weakened sections 170 to facilitate removal of the compartments 124 and 126.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A communications cable, comprising:
a core, comprising:
a dielectric separator comprising:
a spline extending longitudinally in said core and dividing said core into halves, the spline having opposing ends;
a first compartment attached to the spline and defining a first centerline;
a second compartment attached to said spline and defining a second centerline, wherein the spline is disposed between said first and second compartments;
at least one pair of twisted insulated conductors received in at least one of said halves of said core and being external to each of said first and second compartments; and
a first optical fiber received in said first compartment of said dielectric separator;
a second optical fiber received in said second compartment of said dielectric separator; and
an outer jacket substantially surrounding said core; wherein:
said opposing ends of the spline contact an inner surface of said outer jacket at first and second locations;
said first and second locations are a spaced apart by a first distance;
said first and second centerlines of said first and second optical fibers are spaced apart by a second distance; and
said first distance is greater than said second distance.

2. A communications cable according to claim 1, wherein said spline, said first compartment, and said second compartment are formed together in a unitary one-piece member.

3. A communications cable according to claim 2, wherein respective webs connect said first compartment, and said second compartment to said spline.

4. A communications cable according to claim 3, wherein a weakened section is provided in each of said webs allowing said first compartment, and said second compartment to tear away from said spline.

5. A communications cable according to claim 4, further comprising
a ripcord provided in each of said webs to facilitate tearing away of said first compartment, and said second compartment from said spline.

6. A communications cable according to claim 1, wherein said first compartment, and said second compartment is connected to said spline near a center of said spline.

7. A communications cable according to claim 1, wherein said first compartment, and said second compartment each contact an inner surface of said outer jacket.

8. A communications cable according to claim 1, wherein said dielectric separator is formed of a thermoplastic polymer.

9. A communications cable according to claim 8, wherein said dielectric separator is formed of one of polyvinyl chloride, polyolefin, fluoropolymer, polyetherimide.

10. A communications cable, comprising:
a core, comprising:
a dielectric separator comprising:
a spline extending longitudinally in said core and dividing said core into halves, the spline having opposing ends;
a first compartment extending along one side of the spline and defining a first channel configured to receive an optical fiber, said first compartment defining a first centerline; and
a second compartment extending along an opposite side of said spline opposite the first compartment and defining a second channel configured to receive another optical fiber, said second compartment defining a second centerline; and
an outer jacket substantially surrounding said core; wherein:
said opposing ends contact an inner surface of said outer jacket at first and second locations;
said first and second locations are a spaced apart by a first distance;
said first and second centerlines of said first and second optical fibers are spaced apart by a second distance; and
said first distance is greater than said second distance.

11. A communications cable according to claim 10, wherein
said spline and said first and second compartments are integral such that said dielectric separator is a unitary one-piece member.

12. A communications cable according to claim 11, wherein
a respective web connects each of said first and second compartments to said spline.

13. A communications cable according to claim 12, wherein
a weakened section is provided in each respective web allowing said first and second compartments to tear away from said spline.

14. A communications cable according to claim 10, wherein
said first and second compartments are connected to said spline near a center of said spline, such that said dielectric separator has a crossweb shape.

15. A communications cable according to claim 10, wherein
the first channel and the second channel each have a cross-sectional shape that is substantially circular.

16. A communications cable according to claim 7 wherein said first and second compartments contact said inner surface of said outer jacket at a different location than where said opposing ends contact said inner surface of said outer jacket.

17. A communications cable according to claim 1 wherein said first and second compartments are disposed entirely on opposite sides of the spline such that each of the first and second compartments is located in different halves of the core.

18. A communications cable according to claim 1 wherein said opposing ends of the spline are devoid of any compartments.

19. A communications cable according to claim 10 wherein said opposing ends of the spline are devoid of any compartments.

\* \* \* \* \*

UNITED STATES PATENT AND TRADEMARK OFFICE
CERTIFICATE OF CORRECTION

PATENT NO. : 9,136,045 B2
APPLICATION NO. : 14/067366
DATED : September 15, 2015
INVENTOR(S) : Michael J. Burke et al.

It is certified that error appears in the above-identified patent and that said Letters Patent is hereby corrected as shown below:

In the claims
Claim 1, column 3, line 41, change "a spaced" to --spaced--;
Claim 1, column 3, line 44, change "optical fibers" to --compartments--;
Claim 10, column 4, line 27, change "a spaced" to --spaced--; and
Claim 10, column 4, line 30, change "optical fibers" to --compartments--.

Signed and Sealed this
Ninth Day of August, 2016

Michelle K. Lee
*Director of the United States Patent and Trademark Office*